United States Patent
Craft et al.

(10) Patent No.: US 7,355,718 B2
(45) Date of Patent: Apr. 8, 2008

(54) PRESSURE SENSOR HAVING TWO MATERIALS WITH DIFFERENT COEFFICIENTS OF THERMAL EXPANSION CONFIGURED TO REDUCE TEMPERATURE DEPENDENCE

(75) Inventors: William Jacob Craft, Whitsett, NC (US); Rahul Gupta, Wilmington, DE (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 126 days.

(21) Appl. No.: 11/278,559

(22) Filed: Apr. 4, 2006

(65) Prior Publication Data

US 2006/0244970 A1 Nov. 2, 2006

Related U.S. Application Data

(60) Provisional application No. 60/667,995, filed on Apr. 4, 2005.

(51) Int. Cl.
*G01B 9/02* (2006.01)
*G01L 1/24* (2006.01)
(52) U.S. Cl. .................. 356/480; 356/35.5; 356/519
(58) Field of Classification Search .............. 356/35.5, 356/454, 480, 519; 359/578
See application file for complete search history.

(56) References Cited

U.S. PATENT DOCUMENTS

| | | | |
|---|---|---|---|
| 5,844,667 A * | 12/1998 | Maron | 356/35.5 |
| 6,281,976 B1 * | 8/2001 | Taylor et al. | 356/480 |
| 6,823,738 B1 * | 11/2004 | Wlodarczyk et al. | 73/705 |
| 7,063,466 B2 * | 6/2006 | Ferguson | 385/78 |

* cited by examiner

Primary Examiner—Michael A. Lyons
(74) Attorney, Agent, or Firm—Myers Bigel Sibley & Sajovec

(57) ABSTRACT

An interferometer pressure sensor includes a reflective film configured to change a position thereof responsive to a pressure change and an interferometer element configured to detect the position change of the reflective film. A holder is configured to hold the reflective film and the interferometer element. The holder includes a first member formed of a first material having a first coefficient of thermal expansion and a second member formed of a second material having a second coefficient of thermal expansion that is different from the first coefficient of thermal expansion. The first member and the second member of the holder are sized and configured based on the first coefficient of thermal expansion and the second coefficient of thermal expansion so that a distance between the reflective film and the interferometer element is substantially constant over a temperature range.

20 Claims, 3 Drawing Sheets

PRESSURE SENSOR HAVING TWO MATERIALS WITH DIFFERENT COEFFICIENTS OF THERMAL EXPANSION CONFIGURED TO REDUCE TEMPERATURE DEPENDENCE

RELATED APLICATIONS

This application claims priority to U.S. Provisional Application 60/667,995, filed Apr. 4, 2005, the disclosure of which is hereby incorporated by reference in its entirety.

FIELD OF THE INVENTION

The present invention relates to pressure sensors and, more particularly, to interferometer pressure sensors.

BACKGROUND OF THE INVENTION

The maintenance of the proper pressure in a tire may enhance the overall performance, safety and economy of the tire. For example, proper tire pressure can reduce thread wear, result in better gas mileage and handing, and reduce the risk of blowouts. Even a relatively small leak in a tire may result in significant pressure loss over the lifetime of the tire. Although some vehicle owners ensure that the tire pressure is tested regularly and repressurized to recommended levels as necessary, others do not notice small leaks and drive on tires with insufficient air pressure.

Industry pressure tests for small leaks generally involve tests that can be time-consuming and expensive. Early industry standard air permeation tests using mercury manometers to monitor slow leaks in tires took as long as 180 days to perform. More recent tests using electronic pressure transducers may be performed in about sixteen days. In addition to the amount of time needed to test tires for small leaks, these tests designed to determine the leakage rate can be in significant errors due to temperature sensitivities inherent in pressure measurement sensors.

SUMMARY OF THE INVENTION

According to embodiments of the present invention, an interferometer pressure sensor includes a reflective film configured to change a position thereof responsive to a pressure change and an interferometer element configured to detect the position change of the reflective film. A holder is configured to hold the reflective film and the interferometer element. The holder includes a first member formed of a first material having a first coefficient of thermal expansion and a second member formed of a second material having a second coefficient of thermal expansion that is different from the first coefficient of thermal expansion. The first member and the second member of the holder are sized and configured based on the first coefficient of thermal expansion and the second coefficient of thermal expansion so that a distance between the reflective film and the interferometer element is substantially constant over a selected temperature range.

According to further embodiments of the present invention, a pressure sensor includes a reference chamber and a testing chamber connected by a valve. A reflective film is positioned between the reference chamber and the testing chamber. The film is configured to change a position thereof responsive to a relative pressure change between the reference chamber and the testing chamber. An interferometer is configured to detect changes in the film position. A pressure in the reference chamber and in the testing chamber is equalized when the valve is in an opened position such that changes in pressure between the reference chamber and the testing chamber are detected by the interferonmeter when the valve is in a closed position.

According to further embodiments of the present invention, methods of manufacturing a pressure sensor include selecting a first material having a first coefficient of thermal expansion and a second material having a second coefficient of thermal expansion that is different from the first coefficient of thermal expansion. A geometric configuration for a holder formed from the first material and the second material is selected. The holder is configured to hold a reflective film that changes a position thereof responsive to a pressure change and an interferometer element configured to detect the position change of the reflective film. A first member of the holder formed of the first material and a second member of the holder formed of the second material are sized and configured based on the first coefficient of thermal expansion and the second coefficient of thermal expansion so that a distance between the reflective film and the interferometer element is substantially constant over a selected temperature range.

Further features, advantages and details of the present invention will be appreciated by those of ordinary skill in the art from a reading of the figures and the detailed description of the embodiments that follow, such description being merely illustrative of the present invention.

DETAILED DESCRIPTION OF THE INVENTION

Figure 1:
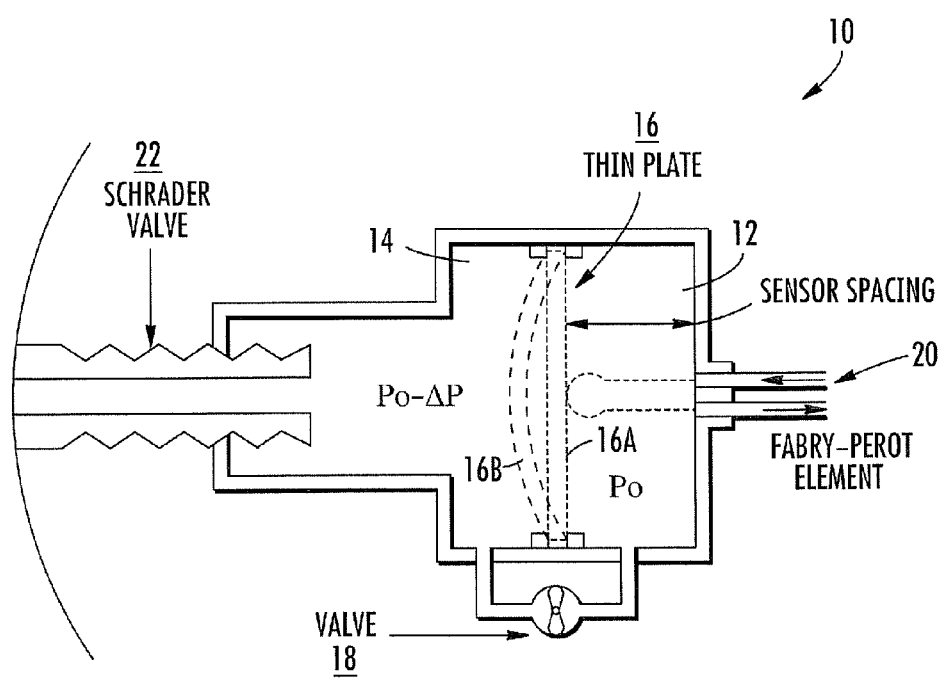
FIG. 1 is a schematic diagram of a pressure sensor having two chambers according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

An exemplary pressure sensor 10 is illustrated in FIG. 1. The pressure sensor 10 includes a reference chamber 12, a testing chamber 14, a reflective plate 16, a valve 18, an interferometer element 20, and a Schrader valve connector 22.

The valve 18 connects the reference chamber 12 and the testing chamber 14. When the valve 18 is open, gas in the chambers 12, 14 can flow therebetween so that the pressure in the chambers 12, 14 is equalized. When the valve 18 is closed, the chambers 12, 14 are isolated from one another and the pressures in the respective chambers 12, 14 may be different. When the pressures in the chambers 12, 14 are the same, the plate 16 is generally in an equilibrium position 16A. When the pressures in the chambers 12,14 are different, then the plate 16 changes position to a deflected position 16B. As illustrated in FIG. 1, the plate 16 is deflected away from the reference chamber 12 in the deflected position 16B, which indicates that the pressure of the reference chamber 12 is greater than that of the testing chamber 14. It should be understood that the plate 16 may also be deflected toward the reference chamber 12, which indicates that the pressure of the reference chamber 12 is less than that of the testing chamber 14.

The interferometer element 20 is positioned to detect any change in position between the reflective plate 16 and the interferometer element 20. Specifically, the interferometer element 20 includes an optical fiber provided as part of a Fabry-Perot interferometer that shines light onto the reflective plate 16 and detects light reflected from the plate 16. Fabry-Perot interferometers are described, for example, in U.S. Pat. No. 6,281,976 to Taylor, the disclosure of which is incorporated herein by reference in its entirety. The interferometer element 20 detects changes in the position of the reflective plate 16 due to a pressure change between the chambers 12, 14.

The Schrader valve connector 22 is configured to open when it is connected to a Schrader valve of a tire and to allow fluid flow between the tire and the testing chamber 14.

In this configuration, a slow leak in a tire or other device can be detected. The Schrader valve connector 22 is connected to the tire and the valve 18 is opened. In this position, the air from the tire flows into the reference chamber 12 and the testing chamber 14. When the valve 18 is opened, the reflecting plate 16 is in the equilibrium position 16A, and the pressure in the reference chamber 12 is the same as the pressure in the testing chamber 14.

After equalizing the pressure in the chambers 12, 14 to the pressure in the tire, the valve 18 is closed and the chambers 12, 14 are isolated from one another. Thus, the reference chamber 12 is sealed and the pressure of the reference chamber 12 remains at substantially the same level as the initial pressure of the tire. The testing chamber 14 is in fluid communication with the tire through the Schrader valve connector 22; therefore, the pressure in the testing chamber 14 fluctuates with the pressure of the tire. If the tire has a slow leak, the pressure in the testing chamber 14 will decrease, causing the reflecting plate 16 to deflect into the deflected position 16B. The change in the position of the reflecting plate 16 corresponding to the change in pressure is detected by the interferometer element 20.

A change in position of the reflecting plate 16 of about $10^{-8}$ inches or less may be detected by the optical fiber interferometry configuration shown in FIG. 1. The corresponding pressure differential detected using the configuration of FIG. 1 may be less than 1/2000 psi.

The reflective plate 16 can be any relatively thin material that can reflect light, such as a reflective film or a film with a reflective coating thereon. Without wishing to be bound by thieory, the reflective plate 16 can be a thin circular plate and modeled as a simply supported uniformly loaded thin plate. The Center Deflection and Maximum Stress Equations for a circular plate acted on by a uniform pressure, Δp, are given by:

$$w_{Max} = \frac{3(1-v)(5+v)\Delta p a^2}{16Et^3} \text{ and } \sigma_{Max} = \frac{3(3+v)\Delta p a^2}{8t^2}$$

where v, E, a, and t are, respectively, Poisson's ratio, the Modulus of Elasticity, the radius, and the thickness of the plate. λ, the sensitivity constant, and $\Delta p_{Min}$, the sensitivity threshold, are:

$$\lambda = \frac{\Delta p}{w_{Max}} \text{ and } \therefore \lambda = \frac{16Et^3}{3(1-v)(5+v)a^2}$$

$$\therefore \Delta p_{Min} = \lambda * (\text{Displacement Sensitivity})$$

The "Displacement Sensitivity" is the minimum displacement that can be detected by the interferometer. As would be understood by those of skill in the art, an interferometer generally has an inherent limit to its ability to detect displacement. Therefore, the "Displacement Sensitivity" refers to the minimum detectable displacement, which may be about one nanometer. Setting $w_{max}$ to the smallest change in distance that the instrumentation can detect and solving the above equations yields the minimum pressure or change in pressure that can be detected in this example.

Hence, to achieve the minimum pressure differential threshold, $\Delta p_{Min}$, the displacement sensitivity and/or λ, must be reduced. This may be accomplished by reducing t (the thickness of the plate), by increasing a (the radius of the plate) or by decreasing E (the Modulus of Elasticity) to achieve smaller and smaller pressure differentials. Displacement sensitivities of less than about $10^{-8}$ inches may be achieved with a Fabry-Perot interferometer. However, using a Fabry-Perot interferometer with a sensitivity of only $10^{-6}$ can result in pressure sensitivities of substantially less than 1/2000 psi when a 1 inch radius cylindrical disk of aluminum with a thickness of 0.05 inches is used as the reflective plate 16. Accordingly, the components of λ are either dimensional or material constants, which can result in a sensor 10 that may be substantially linear over a wide range of deflections.

As would be understood by one of ordinary skill in the art, a change in pressure between the chambers 12, 14 can result in a temperature change between the chambers as predicted by the ideal gas law. If the sensor 10 is temperature dependent, it may be desirable to wait until the temperatures of the chambers 12, 14 equalize. It is also noted that when the plate 16 is in a deflected position 16B, the volume of the chambers may change slightly. However, the chambers 12, 14 may be sized and configured such that any change in volume due to the deflection of the plate 16 is relatively small.

Although embodiments according to the present invention are described in FIG. 1 with respect to a Schader valve connector 22 that is configured to connect the sensor 10 to a tire, it should be understood that the sensor 10 can be used to measure pressure changes in any number of environments. For example, the sensor 10 may be used to measure relatively small changes in atmospheric pressure by venting the chamber 14 to the atmosphere and sealing the chamber 12. The sensor 10 may be useful in measuring changes in the atmospheric pressure in tenuous thin atmospheres, e.g., for space exploration, such as on the surface of the planet Mars, by venting the chamber 14 and placing the chamber 12 in a vacuum. As another example, changes in pressure across a gas turbine during operation thereof may be measured by attaching the chamber 12 to the input flow side of the turbine and connecting the chamber 14 to the output flow leaving the turbine. Moreover, although a Fabry-Perot interferometer has been described in FIG. 1, any suitable detector can be used to detect the change in position of the reflective plate 16, and the interferometer element 20 may be part of any suitable interferometer, such as a Michelson interferometer, a Rayleigh interferometer, a Mach-Zehnder interferometer, or a Sagnac interferometer. Less sensitive instrumentation may also be used if the pressure differential requirements are not so extreme.

In some embodiments, the pressure sensor 10 may be used in a temperature-controlled room to reduce thermal sensitivities. In addition, reducing the distance between the interferometer element 20 and the reflective plate 16, for example, to about 0.3 mm or less may also reduce the thermal sensitivity.

In particular embodiments according to the present invention, two or more materials can be used to hold a reflective film and an interferometer element, the materials being sized and configured based on the respective coefficients of thermal expansion of the materials, so that the distance between the reflective film and the interferometer element is substantially constant over a temperature range.

Figure 2:
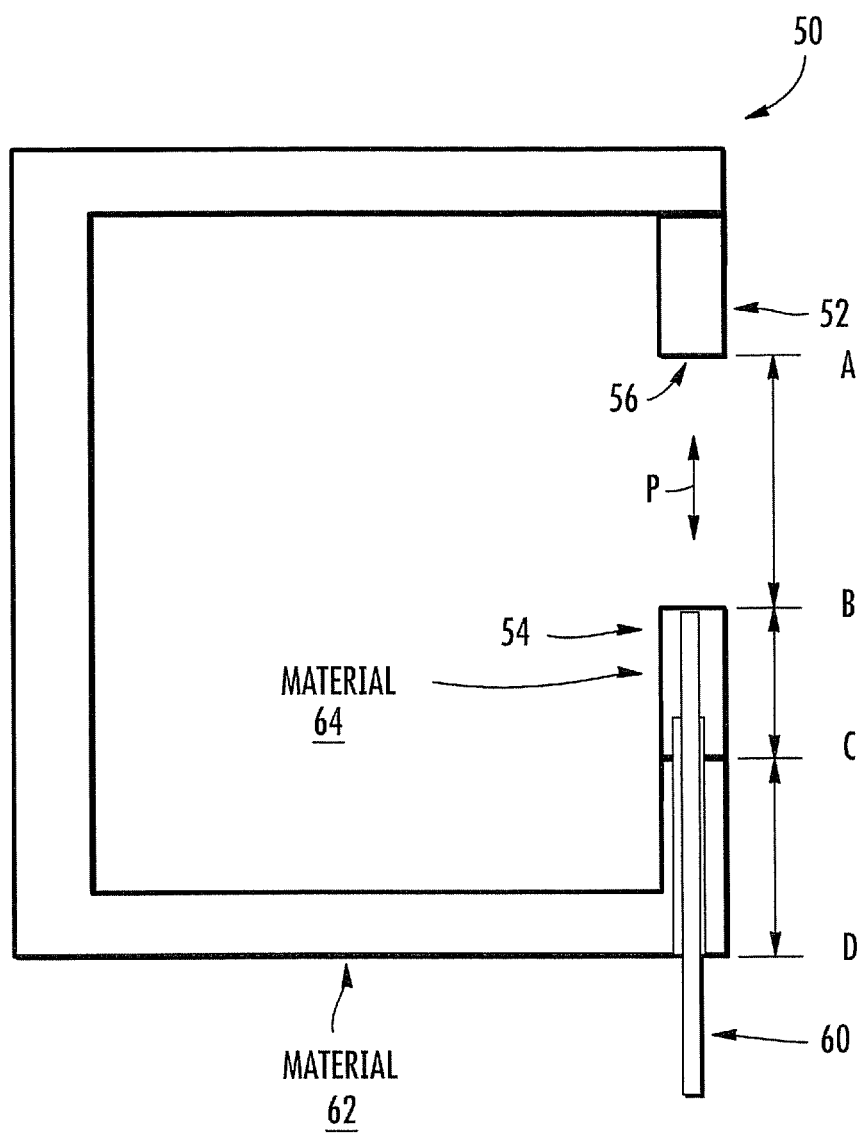
FIG. 2 is a schematic diagram of a pressure sensor having two materials with different coefficients of thermal expansion according to embodiments of the present invention.

For example, as illustrated in FIG. 2, a holder 50 is shown that includes two ends 52, 54 and is formed of two members 62, 64 formed of different materials. The holder 50 is configured to hold a reflective plate 56 at the end 52 and an interferometer element 60 at the end 54. A portion of the end 54 is formed of the member 64. As illustrated, A-B is the length between the reflective plate 56 and the interferometer element 60 along a primary axis P; B-C is the length of the portion of the end 54 that is formed from the member 64 along the axis P; C-D is the distance of the portion of the end 54 that is formed from the member 62 along the axis P; and A-C is the distance between the reflexive plate 56 and the far end of the portion of the end 54 that is formed from the member 62. The materials of the respective members 62, 64 have different respective coefficients of thermal expansion $\alpha_{Mat-1}$, $\alpha_{Mat-2}$. The members 62, 64 are sized and configured based on the coefficients of thermal expansion $\alpha_{Mat-1}$, $\alpha_{Mat-2}$ of the two materials so that the distance A-B can be substantially constant over a temperature range and/or can have highly linear characteristics.

Without wishing to be bound by theory, when there is an increase in the temperature of the members 62, 64, there is generally an expansion of both of the members 62, 64 according to the respective coefficients of thermal expansion $\alpha_{Mat-1}$, $\alpha_{Mat-2}$. Likewise, when there is a decrease in the temperatures the materials contract. The distance A-C generally changes based on the coefficient of expansion $\alpha_{Mat-1}$ of the member 62 and is independent of the coefficient of thermal expansion $\alpha_{Mat-2}$ of the member 64.

Therefore, because point A is connected to point C by member 62, which is formed of a single material having a coefficient of thermal expansion $\alpha_{Mat-1}$, the change in the length of A-C can be expressed as follows:

$$\delta_{AC} = \alpha_{Mat-1} \Delta T l_{AC}.$$

where $\delta_{AC}$ is the change in distance along A-C, ΔT is the change in temperature, and $l_{AC}$ is the length of A-C. However, the change in A-C may also be written as the sum of the changes of A-B and B-C. This may be expressed as follows:

$$\delta_{AC} = \delta_{AB} + \delta_{BC} = \delta_{AB} + \alpha_{Mat-2} \Delta T l_{BC}.$$

The change in the distance A-B may be set to zero or $\delta_{AB} = 0$. $\delta_{AB} = 0$. As a result, $$\alpha_{Mat-1} l_{AC} = \alpha_{Mat-2} l_{BC} \text{ or } \alpha_{Mat-1}(l_{AB} + l_{BC}) = \alpha_{Mat-2} l_{BC}.$$

Solving for the distance $l_{AB}$ in terms of $l_{BC}$ and the two coefficients of expansion provides the following expression:

$$\left( \frac{\alpha_{Mat-2}}{\alpha_{Mat-1}} - 1 \right) l_{BC} = l_{AB}.$$

Thus the overall opening, $l_{AB}$, may be tuned so that under a wide range of changes in temperature, the distance, $l_{AB}$, remains constant.

In this configuration, the thermal variation in the distance A-B may be reduced. In some embodiments, the reflecting side of the reflective plate 56 is formed of one material, and the interferometer element 60 is anchored directly at location B facing the reflective plate 56. Although changes in the distance A-B may be caused by mechanical stresses, the thermal variation in the distance A-B may be reduced.

Although the above equations are based on a configuration with two materials, it should be understood that additional materials with different coefficients of thermal expansion may be used. The above equations can be modified to include the change in distance based on the third coefficient of expansion and assigning a value of zero for the distance between the reflective plate 56 and the interferometer element 60 as described above. For example, the interferometer element 60 can be positioned using an adhesive that bonds the interferometer element 60 along a portion thereof and the above equations can be modified to take into account the change in distance based on the coefficient of thermal expansion of the adhesive. In addition, other configurations and geometries may be used with two or more materials, and the above equations can be modified according to the particular geometry of the pressure sensor based on the respective equations.

Although the above equations may be modified to account for the relative expansion between more than two materials, in some embodiments, additional materials may be included in the configuration that are not sized and configured according to the above equations. For example, when an adhesive is used to position the interferometer element with respect to the members 62, 64, the equations above may be used and any changes in the distance A-B due to the coefficient of expansion of the adhesive may be significantly small such that the temperature tolerance of the system is adequate. Other relatively small portions of the holder that are not sized based on relative coefficients of expansion may be incorporated into the pressure sensor without significantly changing the temperature tolerance. For example, a temperature tolerance in a range of between about ±10° C. from an initial temperature to about ±30° C. from an initial temperature or more with a change in the distance A-B of less than about 0.1 microns may be acceptable. As another example, the above equations may or may not be modified to take into account the coefficient of expansion of the interferometer element 60 and/or the reflective plate 56.

As another example, the configuration shown in FIG. 2 may be used to measure the thickness of a film. The distance A-B can be measured by the interferometer element 60. A film can be positioned at the end 52 of the holder 50, and a second distance between point B and the end 52 of the holder can be measured by the interferometer. The difference between the measurements is the thickness of the film. The film can be a reflective film or a reflective coating may be added to a non-reflective film so that distances can be measured using the interferometer element 60. Accordingly, thicknesses of materials between about 1 nm to about 300 microns can be measured, depending on the sensitivity of the interferometer element 60. The thickness measurements may be substantially independent of the temperature due to the configuration of the holder 50 as described above.

Figure 3:
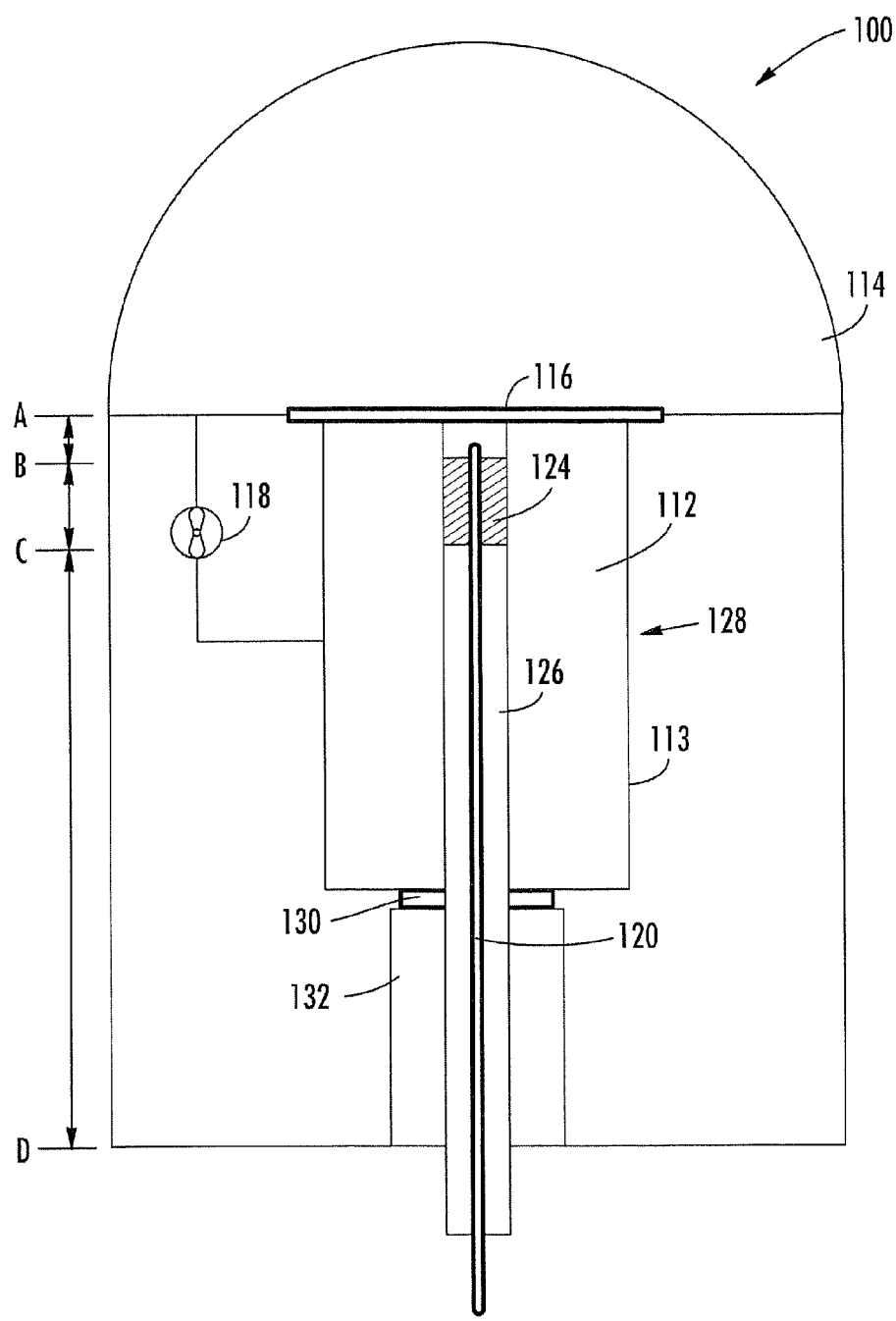
FIG. 3 is a schematic diagram of a pressure sensor having two materials with different coefficients of thermal expansion and two chambers according to embodiments of the present invention.

In some embodiments, the thickness of a material can be measured using the techniques described above over a range of temperatures to determine the coefficient of expansion of the material With reference to FIG. 3, a pressure sensor 100 having a reference chamber 112 with an outer portion 113 thereof, a testing chamber 114 and a valve 118 between the reference chamber 112 and the testing chamber 114 is shown. The pressure sensor 100 includes a reflective plate 116 and an interferometer element 120 surrounded by an enclosure 126. The sensor 100 also includes a holder 128, a seal 130, and a fastening portion 132. The holder 128 holds the reflective plate 116 and the interferometer element 120 a distance A-B from one another. The holder 128 includes the portions of the sensor 100 that support and hold the reflective plate 116 and the interferometer element 120. In particular, the holder 128 includes the outer portion 113 of the reference chamber 112 and the enclosure 126. The seal 130 provides a seal to the reference chamber 112, and the fastening portion 132 fastens the enclosure 126 and the interferometer element 120 in position. For example, the fastening portion 132 can be a threaded cylindrical piece and the outer portion of the enclosure 126 can be threaded so that the enclosure 126 and the interferometer element 120 may be threaded into the fastening portion 132. Other fastening configurations can be used, including adhesives, welds, laser welds, and compression fittings.

The holder 128 includes a portion 124 that is formed from a material that is different than the material used to form the remaining portion of the holder 128. As illustrated in FIG. 3, the distances A-B, B-C, and A-C essentially correspond to the distances labeled A-B, B-C, and A-C in FIG. 2. The equations described above can be used to size and configure the distances A-B, B-C, and A-C in FIG. 3 as described above.

In some embodiments, the testing chamber 114 can include a valve (not shown), such as a Schrader valve, for connecting the testing chamber 114 to a tire or other chamber at a certain pressure. The valve to the tire being tested can be opened to equalize the pressure of the testing chamber 114 to that of the chamber being tested. In this configuration, the valve 118 can be used to equalize the pressure between the reference chamber 112 and the testing chamber 114. The valve 118 can be closed so that any leaks in the tire result in a reduction of pressure in the testing chamber 114. The reference chamber 112 is isolated and maintains the initial pressure of the tire. Therefore, any change in tire pressure can be detected by a deflection of the reflective plate 116, as is described above with respect to FIG. 1.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings That which is claimed is:

1. An interferometer pressure sensor comprising:
   a reflective film configured to change a position thereof responsive to a pressure change;
   an interferometer element configured to detect the position change of the reflective film;
   a holder configured to hold the reflective film and the interferometer element, the holder comprising a first member formed of a first material having a first coefficient of thermal expansion and a second member formed of a second material having a second coefficient of thermal expansion that is different from the first coefficient of thermal expansion, the first member and the second member of the holder being sized and configured based on the first coefficient of thermal expansion and the second coefficient of thermal expansion so that a distance between the reflective film and the interferometer element is substantially constant over a selected temperature range.

2. The interferometer pressure sensor of claim 1, wherein the distance between the reflective film and the interferometer element is a first distance defining a primary axis, the holder includes a first end configured to receive one of the reflective film or the interferometer element and a second end configured to receive the other of the reflective film or the interferometer element, a portion of the second end comprises the second member and defines a second distance along the primary axis, and the first distance and the second distance satisfy the following equation:

$$\left(\frac{\alpha_{Mat-2}}{\alpha_{Mat-1}} - 1\right)l_{BC} = l_{AB}$$

where $l_{AB}$ is the first distance, $\alpha_{Mat-1}$ is the first coefficient of expansion, $\alpha_{Mat-2}$ is the second coefficient of expansion, and $l_{BC}$ is a second distance.

3. The interferometer pressure sensor of claim 1, wherein the temperature range is about ±10° C. from an initial temperature.

4. The interferometer pressure sensor of claim 3, wherein the distance between the reflective film and the interferometer varies within a tolerance of about 20 nanometers or less over the temperature range.

5. The interferometer pressure sensor of claim 1, further comprising a reference chamber and a testing chamber connected by a valve, wherein the reflective film is positioned between the reference chamber and the testing chamber, the film being configured to change the position thereof responsive to a relative pressure change between the reference chamber and the testing chamber.

6. The pressure sensor of claim 1, wherein the testing chamber is configured to connect to a tire.

7. The pressure sensor of claim 6, wherein the testing chamber includes a Schrader valve configured to connect to a tire.

8. The pressure sensor of claim 1, wherein the interferometer is a Fabry-Perot interferometer.

9. The pressure sensor of claim 1, wherein the reflective film is formed of one of the first or second materials.

10. A pressure sensor comprising:
    a reference chamber and a testing chamber connected by a valve;
    a reflective film positioned between the reference chamber and the testing chamber, the film being configured to change a position thereof responsive to a relative pressure change between the reference chamber and the testing chamber; and
    an interferometer configured to detect changes in the film position, wherein a pressure in the reference chamber and in the testing chamber is equalized when the valve is in an opened position such that changes in pressure between the reference chamber and the testing chamber are detected by the interferometer when the valve is in a closed position.

11. The pressure sensor of claim 10, wherein the testing chamber is configured to connect to a tire.

12. The pressure sensor of claim 10, wherein the interferometer is a Fabry-Perot interferometer.

13. A method of manufacturing a pressure sensor, the method comprising:
    selecting a first material having a first coefficient of thermal expansion and a second material having a second coefficient of thermal expansion that is different from the first coefficient of thermal expansion;
    selecting a geometric configuration for a holder formed from the first material and the second material, the holder being configured to hold a reflective film that changes a position thereof responsive to a pressure change and an interferometer element configured to detect the position change of the reflective film; and
    sizing a first member of the holder formed of the first material and a second member of the holder formed of the second material based on the first coefficient of thermal expansion and the second coefficient of thermal expansion so that a distance between the reflective film and the interferometer element is substantially constant over a selected temperature range.

14. The method of claim 13, wherein the distance between the reflective film and the interferometer element is a first distance defining a primary axis, the holder includes a first end configured to receive one of the reflective film or the interferometer element and a second end configured to receive the other of the reflective film or the interferometer element, a portion of the second end comprises the second material and defines a second distance along the primary axis, the method further comprising calculating the first distance and the second distance by the following:

$$\left(\frac{\alpha_{Mat-2}}{\alpha_{Mat-1}} - 1\right)l_{BC} = l_{AB}$$

where $l_{AB}$ is the first distance, $\alpha_{Mat-1}$ is the first coefficient of expansion, $\alpha_{Mat-2}$ is the second coefficient of expansion, and $l_{BC}$ is a second distance.

15. The method of claim 13, wherein the temperature range is between about 10° C. and about 20° C.

16. The method of claim 13, wherein the distance between the reflective film and the interferometer has a tolerance of about 20 nanometers over the temperature range.

17. The method of claim 13, further comprising forming the reflective film of one of the first or second materials.

18. The method of claim 13, wherein sizing the first member and the second member of the holder comprises calculating the change in one or more distances of the holder based on the coefficients of thermal expansion and assigning a value of zero for a distance between the reflective plate and the interferometer element.

19. An interferometer assembly, the interferometer assembly comprising:

a holder configured to hold a reflective film and an interferometer element, the holder comprising a first member formed of a first material having a first coefficient of thermal expansion and a second member formed of a second material having a second coefficient of thermal expansion that is different from the first coefficient of thermal expansion, the first member and the second member of the holder being sized and configured based on the first coefficient of thermal expansion and the second coefficient of thermal expansion so that a distance between the reflective film and the interferometer element is substantially constant over a selected temperature range.

20. The assembly of claim 19, wherein the distance between the reflective film and the interferometer element is a first distance and the reflective film is removably attached to the holder at a reflective end thereof so that the assembly is configured to measure a thickness of the reflective film based on a difference between a second distance between the reflective end of the holder and the interferometer element and the first distance.

* * * * *